United States Patent
Zhang et al.

(10) Patent No.: US 9,143,397 B2
(45) Date of Patent: Sep. 22, 2015

(54) METHOD AND APPARATUS FOR RECOVERING SERVICE

(71) Applicant: Huawei Technologies Co., Ltd., Shenzhen, Guangdong (CN)

(72) Inventors: Yan Zhang, Nanjing (CN); Qinfeng Gu, Nanjing (CN); Feng Chen, Nanjing (CN); Wenqi Liao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/306,038

(22) Filed: Jun. 16, 2014

(65) Prior Publication Data

US 2014/0293773 A1 Oct. 2, 2014

Related U.S. Application Data

(63) Continuation of application No. PCT/CN2012/079094, filed on Jul. 24, 2012.

(30) Foreign Application Priority Data

Dec. 16, 2011 (CN) .......................... 2011 1 0424339

(51) Int. Cl.
*H04L 12/26* (2006.01)
*H04L 12/24* (2006.01)
(Continued)

(52) U.S. Cl.
CPC .......... *H04L 41/0654* (2013.01); *H04L 12/462* (2013.01); *H04L 12/4654* (2013.01); *H04L 12/4675* (2013.01); *H04L 45/28* (2013.01)

(58) Field of Classification Search
CPC ......... H04L 12/24; H04L 12/26; H04L 12/44; H04L 12/70; H04L 12/56; H04L 12/42; H04L 12/28; H04L 45/66; H04L 12/4641; H04L 12/4625
USPC ......... 370/221, 223, 225, 228, 252, 254, 255, 370/256, 390, 392, 401, 410; 709/220
See application file for complete search history.

(56) References Cited

U.S. PATENT DOCUMENTS 8,576,702 B2 * 11/2013 Boddapati et al. ............ 370/219
2008/0186844 A1 8/2008 He et al.
(Continued)

FOREIGN PATENT DOCUMENTS

CN 1870632 A 11/2006
CN 1968504 A 5/2007
(Continued)

OTHER PUBLICATIONS

Perlman et al., "Routing Bridges (RBridges): Appointed Forwarders," Internet Engineering Task Force (IETF), Request for Comments: 6439, pp. 1-15, Internet Society, Geneva, Switzerland (Nov. 2011).

(Continued)

*Primary Examiner* — Jamal Javaid
*Assistant Examiner* — Wali Butt
(74) *Attorney, Agent, or Firm* — Leydig, Voit & Mayer, Ltd.

(57) ABSTRACT

The present application provides a method and an apparatus for avoiding interruptions in an on-going service. A LAN bridge intercepts a trusted port connected to a first routing bridge; determines whether the first routing bridge is forwarding or has a permission to forward data flow from a C-VLAN according to a result of the interception; and if the first routing bridge is not forwarding or no longer has the permission to forward the data flow from the C-VLAN, broadcasts the data flow from the C-VLAN to a second routing bridge so that the second routing bridge forwards the data flow from the C-VLAN. With the method provided in the embodiments of the present application, a forwarding path can be rapidly switched when a designated routing bridge is faulty and cannot carry out a traffic forwarding function or an appointed forwarder of a customer VLAN is changed.

13 Claims, 6 Drawing Sheets

(51) Int. Cl.
H04L 12/46 (2006.01)
H04L 12/703 (2013.01)

(56) References Cited

U.S. PATENT DOCUMENTS

| | | | |
|---|---|---|---|
| 2010/0098082 A1* | 4/2010 | Sampath et al. | 370/392 |
| 2011/0019678 A1* | 1/2011 | Mehta et al. | 370/401 |
| 2011/0228669 A1* | 9/2011 | Lei et al. | 370/219 |
| 2011/0267962 A1* | 11/2011 | J S A et al. | 370/242 |
| 2011/0299414 A1 | 12/2011 | Yu et al. | |
| 2011/0299531 A1* | 12/2011 | Yu et al. | 370/392 |
| 2011/0299536 A1* | 12/2011 | Cheng et al. | 370/392 |
| 2012/0177045 A1* | 7/2012 | Berman | 370/392 |
| 2012/0201124 A1* | 8/2012 | Marques et al. | 370/221 |
| 2012/0300620 A1* | 11/2012 | Kothari et al. | 370/225 |
| 2013/0100851 A1* | 4/2013 | Bacthu et al. | 370/254 |
| 2014/0036682 A1* | 2/2014 | Tian et al. | 370/235 |

FOREIGN PATENT DOCUMENTS

| | | |
|---|---|---|
| CN | 101127724 A | 2/2008 |
| CN | 101247252 A | 8/2008 |
| CN | 102223303 A | 10/2011 |
| WO | WO 2012075204 A1 * | 6/2012 |
| WO | WO 2012075204 A1 * | 7/2012 |

OTHER PUBLICATIONS

Zhai et al., "RBridges: Pseudonode Nickname," TRILL Working Group, pp. 1-19, Internet Society, Geneva, Switzerland (Nov. 12, 2011).

* cited by examiner

METHOD AND APPARATUS FOR RECOVERING SERVICE

CROSS-REFERENCE TO RELATED APPLICATIONS

This is a continuation of International Patent Application No. PCT/CN2012/079094, filed on Jul. 24, 2012, which claims priority to Chinese Patent Application No. 201110424339.0, filed on Dec. 16, 2011, both of which are incorporated herein by reference in their entireties.

TECHNICAL FIELD

The present application relates to the field of communications, and in particular, to a method and an apparatus for recovering a service.

BACKGROUND

In a "transparent interconnection of lots of links" (TRILL) network, a customer accessing the TRILL network in a dual-homing manner through a local area network (LAN) bridge may encounter the following scenario: When a customer packet is broadcast on the LAN bridge, two copies of the packet may enter the TRILL network, which may cause a traffic loop. In order to avoid this problem, the TRILL protocol specifies that a Hello packet may be sent mutually between two routing bridges (RB), such as RB1 and RB2, for negotiating a designated routing bridge (DRB). In the DRB obtained through the negotiation, one of the two RBs may be appointed as an appointed forwarder (AF) of a customer virtual local area network (VLAN) for forwarding the traffic. The meaning of the AF lies in that: If a RB is not an AF of a certain customer VLAN, the RB is prohibited from forwarding the traffic of the customer VLAN.

The designation of the AF may change over the time. For example, it is assumed that a TRILL network has two routing bridges RB1 and RB2, and the RB1 is appointed as an AF of a customer VLAN. This means when the traffic of the customer VLAN (C-VLAN) reaches the RB1, it is forwarded by the RB1; while when same traffic reaches the RB2, it is discarded by the RB2.Then, the RB1 is changed to be a non-AF of the customer VLAN and the RB2 becomes an AF. After the change, when the traffic from the customer VLAN reaches the RB2, it is forwarded by the RB2, while when the same traffic reaches the RB1, it is discarded by the RB1.

However, a LAN bridge cannot perceive a change of the AF attribute of a customer VLAN RB in a TRILL network. For example, in the foregoing assumed scenario, the RB1 has been changed from the AF to the non-AF, but the LAN bridge may still send a packet of the customer VLAN to the RB1. Since, at this time, the RB1 is no longer the AF of the customer VLAN, the packet is discarded by the RB1. If the traffic of the customer VLAN reaches a TRILL network through a layer 2 unicast at the LAN bridge, a service may be interrupted at this time.

In order to solve problems of customer traffic switch and service interruption caused by AF attribute change of an RB in a TRILL network, in the prior art, a method is proposed for recovering a service through a media access control (MAC) address aging mechanism of an LAN bridge. However, the default time of MAC address aging is 10 minutes. Therefore, the method provided in the prior art may result in a longer service interruption time, which greatly affects the reliability of a customer unicast service and user experience.

SUMMARY

Embodiments of the present application provide a method and an apparatus for avoiding interruptions in an on-going service, so as to recover a service rapidly and improve the reliability of a customer unicast service.

An embodiment of the present application provides a method for avoiding interruptions in an on-going service, and the method includes: intercepting a first trusted port connected to a first routing bridge, where the first routing bridge is an appointed forwarder of a service data flow from a customer virtual local area network (C-VLAN) to a transparent interconnection of lots of links (TRILL) network;

determining, according to a result of the interception, whether the first routing bridge is forwarding or has a permission to forward the data flow from the C-VLAN; and if the first routing bridge is not forwarding or no longer has the permission to forward the data flow from the C-VLAN, broadcasting the data flow from the C-VLAN to a second routing bridge, so that the second routing bridge forwards the data flow from the C-VLAN to the TRILL network, where the second routing bridge is a neighboring routing bridge of the first routing bridge and it replaces the first routing bridge as a new appointed forwarder for the C-VLAN.

An embodiment of the present application provides an apparatus for avoiding interruptions in an on-going service, and the apparatus includes: an intercepting module, configured to intercept a first trusted port connected to a first routing bridge, where the first routing bridge is an appointed forwarder of a service data flow from a customer virtual local area network (C-VLAN) to a transparent interconnection of lots of links (TRILL) network;

a determining module, configured to determine, according to a result of the intercepting performed by the intercepting module, whether the first routing bridge is forwarding or has a permission to forward the data flow from the C-VLAN to the TRILL network; and a broadcasting module, configured to: if the determining module determines that the first routing bridge is not forwarding or no longer has the permission to forward the data flow from the C-VLAN, broadcast the data flow from the C-VLAN to a second routing bridge, so that the second routing bridge forwards the data flow from the C-VLAN to the TRILL network, where the second routing bridge is a neighboring routing bridge of the first routing bridge and it replaces the first routing bridge as a new appointed forwarder for the C-VLAN.

It can be seen from the foregoing embodiments in the present application that, whether a first routing bridge is forwarding or has the permission to forward the data flow from a C-VLAN may be determined according to a result of intercepting of a trusted port connected to the first routing bridge, and when it is determined that the first routing bridge is not forwarding or no longer has the permission to forward the data flow from the C-VLAN, the traffic from the C-VLAN may be broadcast to a second routing bridge so that the second routing bridge forwards the data flow from the C-VLAN. Therefore, compared with the prior art, with the method provided in the embodiments of the present application, a forwarding path can be rapidly switched when a designated routing bridge is faulty and cannot carry out a traffic forwarding function or an appointed forwarder of a customer VLAN is changed, so that data flow of a unicast service of a customer is forwarded in time, thereby greatly shortening interruption time of the service (may be less than 10 seconds), implementing high reliability of service traffic, and improving user experience.

BRIEF DESCRIPTION OF DRAWINGS

To illustrate the technical solutions in the embodiments of the present application more clearly, accompanying drawings are provided. The following is a brief introduction of the accompanying drawings. Apparently, the accompanying drawings in the following description show merely some embodiments of the present application, and a person skilled in the art may derive other drawings from these accompanying drawings.

DETAILED DESCRIPTION

The following describes the technical solutions in the embodiments of the present application with reference to the accompanying drawings. Apparently, the embodiments to be described are merely a part rather than all of the embodiments of the present application. All other embodiments obtained based on the embodiments described herein shall fall within the protection scope of the present application.

Figure 1:
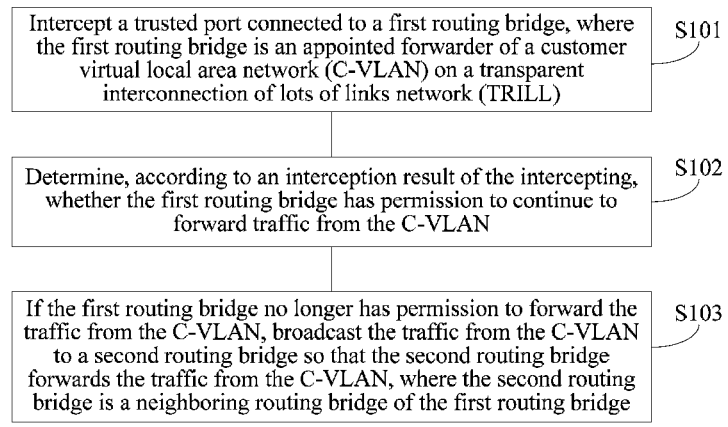
FIG. 1 is a flow chart of a method for recovering a service according to an embodiment of the present application.

Referring to FIG. 1, a flow chart of a method for recovering a service according to an embodiment of the present application is shown, and an execution entity of the method may be a LAN bridge in a TRILL network. In FIG. 1, a first routing bridge and a second routing bridge are used to distinguish two different routing bridges, and the method includes the following:

S101: Intercepting a trusted port connected to a first routing bridge, the first routing bridge is an appointed forwarder of a customer virtual local area network (C-VLAN) on a transparent interconnection of lots of links (TRILL) network.

In the embodiment of the present application, the first routing bridge and a second routing bridge establish a neighboring relationship by sending Hello packets to each other, the second routing bridge and the first routing bridge are neighbors or neighboring routing bridges of each other. During a process of establishing the neighboring relationship, it is negotiated that the first routing bridge is a designated routing bridge (DRB), and when the first routing bridge serving as a DRB becomes invalid, for example, when the first routing bridge is faulty, the second routing bridge serves as AF.

A DRB determined by the negotiation may appoint one of the routing bridges in a neighboring relationship as an appointed forwarder (AF), and in the embodiment of the present application, it is assumed that the first routing bridge serving as the DRB appoints the first routing bridge as the AF for the C-VLAN on the TRILL network. That the first routing bridge is the appointed forwarder for the C-VLAN means that all service traffic from the C-VLAN can be forwarded through the first routing bridge. A LAN bridge may have multiple ports, and therefore, a port connected to the first routing bridge or a port connected to the second routing bridge may be configured as a trusted port. The so-called trusted port refers to a port that is concerned by the LAN bridge. The LAN bridge may execute some operations only directed to the port, for example, performing interception on the port. Specifically, in the embodiment of the present application, when the first routing bridge and the second routing bridge perform interaction of Hello packets through the LAN bridge, the LAN bridge performs, according to configuration, interception on the trusted port connected to the first routing bridge and the trusted port connected to the second routing bridge, so as to know whether these trusted ports receive the Hello packets sent by the first routing bridge and the second routing bridge during the interaction.

S102: Determining, according to a result of the interception, whether the first routing bridge has a permission to continue to forward traffic from the C-VLAN.

The role of a routing bridge serving as an appointed forwarder is not static, and it may be changed in some situations. For example, a routing bridge serving as an appointed forwarder may become faulty and cannot carry out the service traffic forwarding function, or a routing bridge originally serving as an appointed forwarder of one or more certain C-VLANs is no longer an appointed forwarder. Therefore, in the embodiment of the present application, it needs to be determined, according to the result of the interception performed in S101, whether the first routing bridge has a permission to continue to forward traffic from the C-VLAN, so as to avoid a service traffic interruption.

S103: If the first routing bridge no longer has the permission to forward the traffic from the C-VLAN, broadcasting the traffic from the C-VLAN to a second routing bridge so that the second routing bridge forwards the traffic from the C-VLAN.

If the determination result of S102 is that the first routing bridge no longer has the permission to forward the traffic from the C-VLAN, for example, the first routing bridge becomes invalid due to a failure, the LAN bridge broadcasts the traffic from the C-VLAN to the second routing bridge. As described in the foregoing, during the process of the first routing bridge and the second routing bridge establishing a neighboring relationship by sending Hello packets to each other, it is negotiated that the first routing bridge is a DRB, and when the first routing bridge serving as a DRB becomes invalid, the second routing bridge serves as an appointed forwarder. Therefore, when the first routing bridge becomes invalid due to a failure and the LAN bridge broadcasts the traffic from the C-VLAN to the second routing bridge, the second routing bridge forwards the traffic from the C-VLAN.

It can be seen from the foregoing method for recovering a service provided in the embodiment of the present application that, whether or not a first routing bridge has a permission to continue to forward traffic from a C-VLAN may be determined according to an interception result of a trusted port connected to the first routing bridge. When it is determined that the first routing bridge no longer has the permission to forward the traffic from the C-VLAN, the traffic from the C-VLAN may be broadcast to a second routing bridge so that the second routing bridge forwards the traffic from the C-VLAN. Therefore, compared with the prior art, with the method provided in the embodiment of the present application, a forwarding path can be rapidly switched when a designated routing bridge is faulty and cannot carry out a traffic forwarding function or an appointed forwarder of a customer VLAN is changed, so that traffic of a unicast service of a customer is forwarded in time, thereby greatly reducing interruption time of the service (may be less than 10 seconds), implementing high reliability of service traffic, and improving user experience.

By taking that an AF of a C-VLAN is changed or a routing bridge serving as a DRB is faulty as an example, the method for recovering a service according to an embodiment of the present application is further described.

Before intercepting a trusted port connected to a routing bridge, that is, during an initialization, an LAN bridge establishes a correspondence between a trusted port and a routing bridge and a correspondence between a routing bridge and an appointed forwarder of a C-VLAN, that is, a correspondence indicating which routing bridge is an appointed forwarder of which C-VLAN. Referring to content of FIG. 2 and FIG. 3, the correspondence between a trusted port and a routing bridge is shown in Table 1.

TABLE 1

| Trusted Port | Routing Bridge |
|---|---|
| Port 1 | RB1 |
| Port 2 | RB2 |
| ... | ... |

TABLE 2

| Routing Bridge Serving as a Forwarder | C-VLAN Responsible for Forwarding |
|---|---|
| RB1 | C-VLAN1 |
|  | C-VLAN3 |
| RB2 | C-VLAN2 |
|  | C-VLAN6 |
| ... | ... |

In the embodiment of the present application, the LAN bridge establishes a trusted port connected to a first routing bridge, that is, a correspondence between a port 1 and the first routing bridge, and a trusted port connected to a second routing bridge, that is, a correspondence between a port 2 and the second routing bridge as shown in Table 1, and a correspondence between each routing bridge and C-VLANs to be forwarded as shown in Table 2. As an embodiment of the present application, a routing bridge may use its nickname as an identifier. A nickname used as an identifier is unique in a TRILL network. When a routing bridge sends a Hello packet, the packet carries Nickname information, and therefore, when the Hello packet enters from a certain trusted port, which routing bridge sends the Hello packet or the Hello packet is received by which trusted port is known by recording a correspondence between a trusted port and a Nickname Likewise, that a certain routing bridge is an appointed forwarder of which one or more C-VLANs is recorded by establishing a correspondence between a routing bridge and an appointed forwarder of a C-VLAN, for example, in the embodiment of the present application, when the first routing bridge serves as an appointed forwarder of a certain C-VLAN (assuming C-VLAN1), the LAN bridge establishes a correspondence between the first routing bridge and an appointed forwarder for the C-VLAN1, and records the correspondence, as shown in Table 2.

Figure 2:
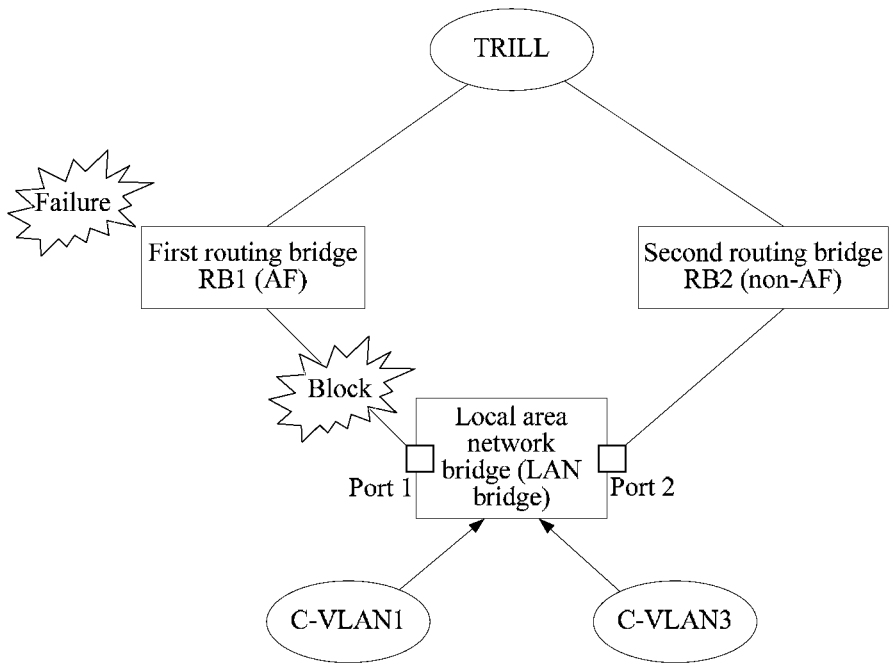
FIG. 2 is a schematic diagram showing that a first routing bridge is faulty and cannot send a Hello packet to a second routing bridge according to an embodiment of the present application.

Optionally, the LAN bridge may start, before starting the interception, a timer to perform timing for the intercepting of the trusted port connected to the first routing bridge. If in several timing periods, for example, 3 periods (a period of a Hello packet on the trusted port of the first routing bridge is 10 seconds, and 3 periods are 30 seconds), no Hello packet is intercepted according to the period on the trusted port connected to the first routing bridge, it is determined that the first routing bridge no longer has permission to continue to forward traffic from the C-VLAN. As shown in FIG. 2, it is assumed that a first routing bridge (RB1) serving as an appointed forwarder of several C-VLANs, for example, C-VLAN1 and C-VLAN3, is faulty and cannot send a Hello packet to a second routing bridge (RB2). A LAN bridge cannot intercept a Hello packet that is received on a trusted port connected to the RB1 in 3 periods (a sending period for the first routing bridge to send a Hello packet), the LAN bridge determines that the RB1 serving as an appointed forwarder for the C-VLAN1 and the C-VLAN3 has become invalid, and determines that the first routing bridge no longer has permission to forward traffic from the C-VLAN1 and the C-VLAN3; meanwhile, because the Hello packet of the RB1 cannot be received, the RB2 can also determined that the RB1 serving as the appointed forwarder for the C-VLAN1 and the C-VLAN3 has become invalid.

After determining, according to an interception result of the intercepting, that the first routing bridge no longer has permission to continue to forward the traffic from the C-VLAN, the LAN bridge clears the established correspondence between the trusted port connected to the first routing bridge and the first routing bridge and the established correspondence between the first routing bridge and the appointed forwarder for the C-VLAN, and deletes MAC entries of all VLANs on the trusted port connected to the first routing bridge. In the example shown in FIG. 2, after determining, according to an interception result of the intercepting, that the RB1 no longer has permission to continue to forward the traffic from the C-VLAN1 and the C-VLAN3, the LAN bridge clears the established correspondence between the trusted port connected to the first routing bridge and the first routing bridge and the established correspondence between the first routing bridge and the appointed forwarder for the C-VLAN1 and the C-VLAN3, and deletes media access control MAC entries of all VLANs on the trusted port connected to the first routing bridge. Therefore, the LAN bridge may broadcast the traffic from the C-VLAN1 and the C-VLAN3, the traffic for the C-VLAN1 and the C-VLAN3 enters the TRILL network through the RB2, and a service is recovered. Because it is set that traffic is broadcast after a Hello packet cannot be intercepted in 3 periods, time for recovering the service is 30 seconds.

The foregoing describes an embodiment where an LAN bridge cannot intercept a Hello packet in set several periods, and in the following, by taking that an LAN bridge can intercept a Hello packet on a trusted port as an example, a method for determining, according to an interception result of intercepting of a trusted port connected to a first routing bridge, whether the first routing bridge has a permission to continue to forward traffic from a C-VLAN is described.

An LAN bridge receives, through a trusted port connected to a first routing bridge, a Hello packet that is sent by the first routing bridge according to a period, and at the same time also receives, through a trusted port connected to a second routing bridge, a Hello packet that is sent by the second routing bridge according to the period. After receiving the Hello packets that are sent by the first routing bridge and the second routing bridge according to the period, the LAN bridge parses the Hello packets that are received through the trusted port connected to the first routing bridge and the trusted port connected to the second routing bridge. If the Hello packet received through the trusted port connected to the first routing bridge carries change information indicating that an appointed forwarder for a C-VLAN is changed from the first routing bridge to the second routing bridge, it is determined that the first routing bridge no longer has permission to continue to forward traffic from the C-VLAN; meanwhile, if the Hello packet received through the trusted port connected to the second routing bridge carries change information indicating that the second routing bridge is changed to the appointed forwarder for the C-VLAN, it is determined that the second routing bridge has permission to forward the traffic from the C-VLAN.

Figure 3:
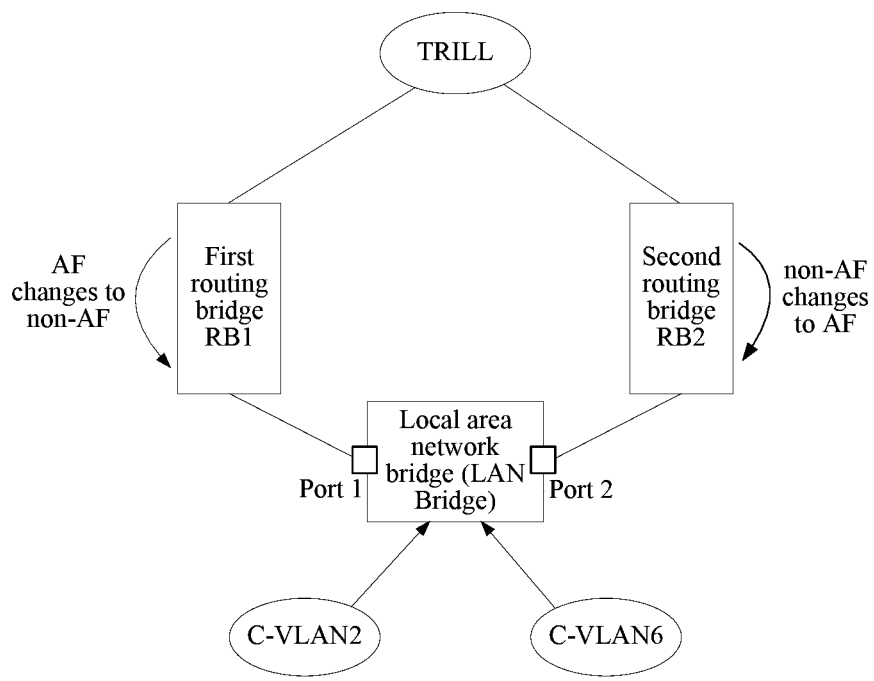
FIG. 3 is a schematic diagram showing that an appointed forwarder of a certain C-VLAN is changed according to an embodiment of the present application.

As shown in FIG. 3, the LAN bridge receives, through a trusted port of the RB1, that is, port 1, a Hello packet that is sent by the RB1 according to a period, and at the same time receives, through a trusted port of the RB2, that is, port 2, a Hello packet that is sent by the RB2 according to the period. Herein, it is assumed that the RB1 is an appointed forwarder of a C-VLAN2 and a C-VLAN6. At a certain moment, the LAN bridge receives the Hello_packets that are sent by the RB1 and the RB2 according to the period, parses the Hello_packets that are received through the trusted port connected to the RB1 and the trusted port connected to the RB2, and if it is found that the Hello packet from the RB1 carries change information, where the change information indicates that the appointed forwarder for the C-VLAN2 is changed from the RB1 to the RB2, it is determined that the RB1 no longer has permission to continue to forward traffic from the C-VLAN2 (but the RB1 still has permission to continue to forward traffic from the C-VLAN6); meanwhile, if the Hello packet from the RB2 also carries change information, where the change information indicates that the RB2 is changed to the appointed forwarder for the C-VLAN2, it is determined that the RB2 has permission to continue to forward the traffic from the C-VLAN2.

After determining that the first routing bridge no longer has the permission to continue to forward the traffic from the C-VLAN, the LAN bridge updates an established correspondence between the first routing bridge and the appointed forwarder for the C-VLAN to a correspondence between the second routing bridge and the appointed forwarder for the C-VLAN, that is, changes the originally recorded first routing bridge serving as the appointed forwarder for the C-VLAN to the second routing bridge serving as the appointed forwarder for the C-VLAN. By taking FIG. 3 as an example, the originally recorded RB1 serving as the appointed forwarder for the C-VLAN2 is changed to the RB2 serving as the appointed forwarder for the C-VLAN2.

At the same time or after that, the LAN bridge deletes a MAC entry of the C-VLAN on the trusted port connected to the first routing bridge.

When determining that the first routing bridge no longer has the permission to forward the traffic from the C-VLAN, the LAN bridge broadcasts the traffic from the C-VLAN to the second routing bridge. The second routing bridge has been changed to the appointed forwarder for the C-VLAN, and therefore, the second routing bridge can forward the traffic from the C-VLAN. By taking FIG. 3 as an example, when determining that the RB1 no longer has permission to forward the traffic from the C-VLAN2, the LAN bridge broadcasts the traffic from the C-VLAN2, so as to introduce the traffic from the C-VLAN2 to the TRILL network through the RB2, a service is recovered, and time for recovering the service is less than 30 seconds.

Figure 4:
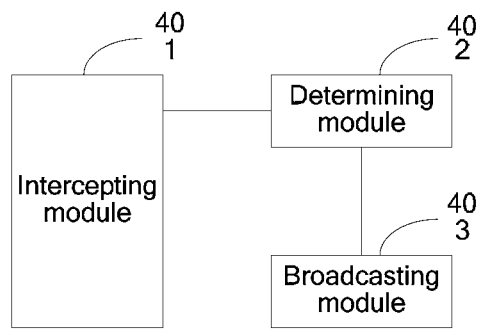
FIG. 4 is a block diagram of an apparatus for recovering a service according to an embodiment of the present application.

FIG. 4 is a schematic structural diagram of an apparatus for recovering a service according to an embodiment of the present application. For ease of description, only parts related to the embodiment of the present application are shown. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The apparatus for recovering a service, shown in FIG. 4, may be a LAN bridge, which includes an intercepting module 401, a determining module 402, and a broadcasting module 403.

The intercepting module 401 is configured to intercept a trusted port connected to a first routing bridge, where the first routing bridge is an appointed forwarder of a C-VLAN on a TRILL network;

The determining module 402 is configured to determine, according to an interception result of the intercepting performed by the intercepting module 401, whether the first routing bridge has a permission to continue to forward traffic from the C-VLAN.

The broadcasting module 403 is configured to: if the determining module 402 determines that the first routing bridge no longer has the permission to forward the traffic from the C-VLAN, broadcast the traffic from the C-VLAN to a second routing bridge so that the second routing bridge forwards the traffic from the C-VLAN, where the second routing bridge is a neighboring routing bridge of the first routing bridge.

It should be noted that, in the foregoing embodiment of the apparatus for recovering a service, division of function modules is only an example for description. In an actual application, the foregoing functions may be distributed to different function modules for implementation according to a requirement, for example, a configuration requirement of relevant hardware or consideration of convenience of software implementation. An internal structure of the apparatus for recovering a service may be divided into different function modules, so as to implement all or a part of the functions described in the foregoing. Moreover, in an actual application, corresponding function modules in this embodiment may be implemented by corresponding hardware, or implemented by corresponding hardware executing corresponding software. For example, the foregoing intercepting module may be hardware capable of intercepting the trusted port connected to the first routing bridge, such as an interceptor, and may also be a general processor or another hardware device capable of executing a corresponding computer program to implement the foregoing function. For another example, the foregoing determining module may be hardware capable of determining, according to an interception result of the intercepting performed by the intercepting module (or interceptor), whether the first routing bridge has permission to continue to forward traffic from the C-VLAN, such as a determiner, and may also be a general processor or another hardware device capable of executing a corresponding computer program to implement the foregoing function (the principle described in the foregoing is applicable to the embodiments provided in the specification).

Figure 5:
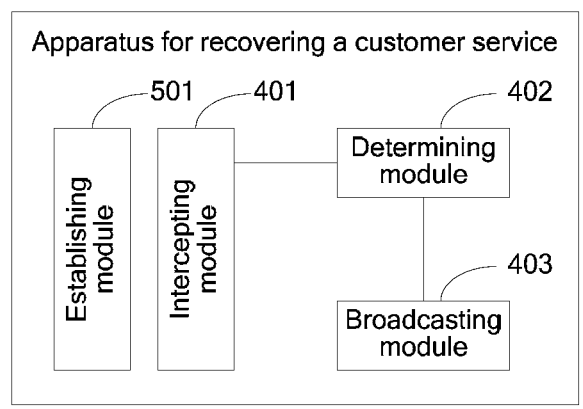
FIG. 5 is a block diagram of an apparatus for recovering a service according to another embodiment of the present application.

The apparatus shown in FIG. 4 may further include an establishing module 501, as shown in an apparatus for recovering a service according to another embodiment of the present application in FIG. 5. The establishing module 501 is configured to establish a correspondence between the trusted port connected to the first routing bridge and an identifier of the first routing bridge and a correspondence between the identifier of the first routing bridge and an appointed forwarder for the C-VLAN.

Figure 6:
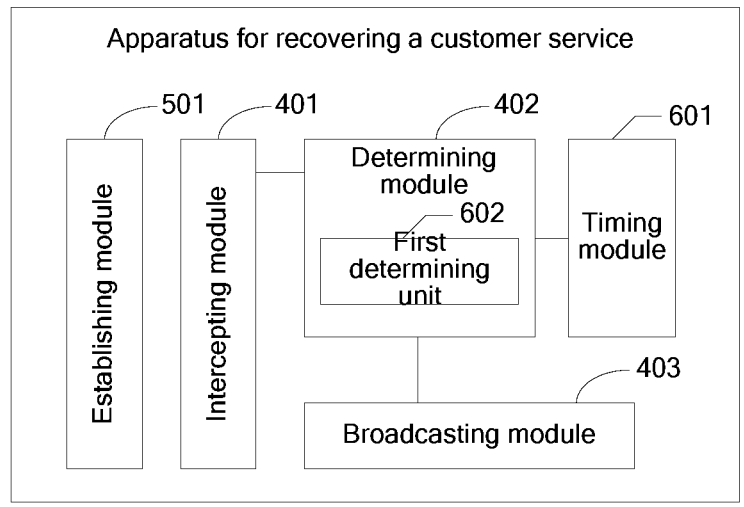
FIG. 6 is a block diagram of an apparatus for recovering a service according to another embodiment of the present application.

The apparatus shown in FIG. 5 may further include a timing module 601, and the determining module 402 may further include a first determining unit 602, as shown in an apparatus for recovering a service according to another embodiment of the present application in FIG. 6.

The timing module 601 is configured to perform timing for the intercepting of the trusted port connected to the first routing bridge.

The first determining unit 602 is configured to: if in several periods in which the timing module 601 performs timing, the intercepting module 401 does not intercept a Hello packet received according to the period on the trusted port connected to the first routing bridge, determine that the first routing bridge no longer has permission to continue to forward the traffic from the C-VLAN.

Figure 7:
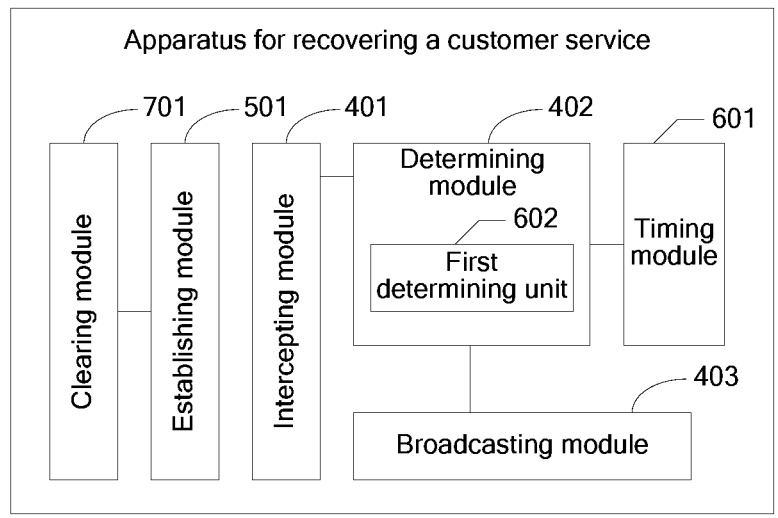
FIG. 7 is a block diagram of an apparatus for recovering a service according to another embodiment of the present application.

The apparatus shown in FIG. 6 may further include a clearing module 701, as shown in an apparatus for recovering a service according to another embodiment of the present application in FIG. 7. The clearing module 701 is configured to clear the established correspondence between the first routing bridge and the appointed forwarder for the C-VLAN.

Figure 8:
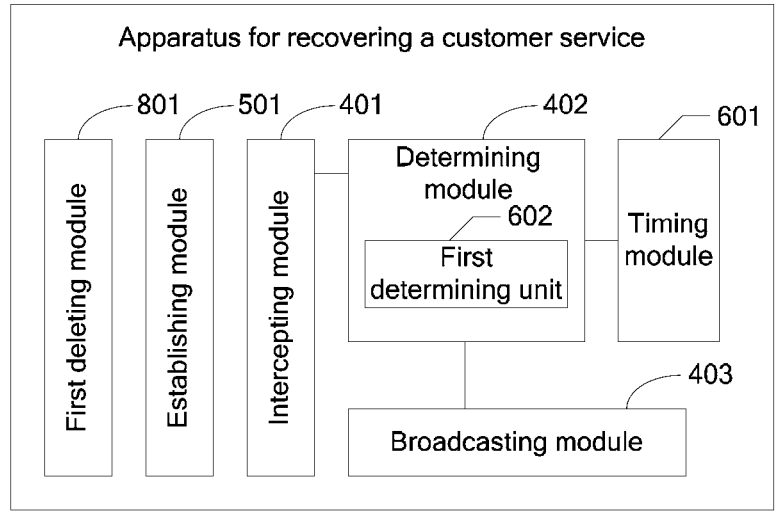
FIG. 8 is a block diagram of an apparatus for recovering a service according to another embodiment of the present application.

The apparatus shown in FIG. 6 may further include a first deleting module 801, as shown in an apparatus for recovering a service according to another embodiment of the present application in FIG. 8. The first deleting module 801 is configured to delete MAC entries of all VLANs on the trusted port connected to the first routing bridge.

Figure 9:
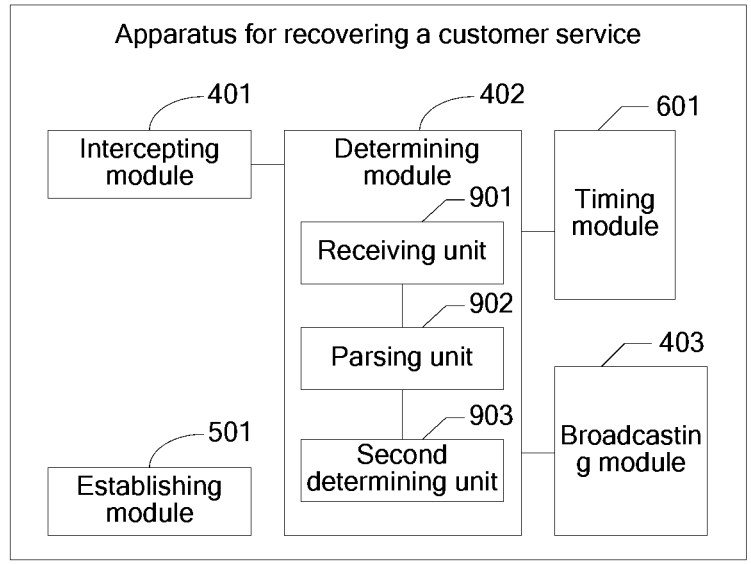
FIG. 9 is a block diagram of an apparatus for recovering a service according to another embodiment of the present application.

The determining module 402 shown in FIG. 5 may also include a receiving unit 901, a parsing unit 902, and a second determining unit 903, as shown in an apparatus for recovering a service according to another embodiment of the present application in FIG. 9.

The receiving unit 901 is configured to receive, through the trusted port connected to the first routing bridge, a Hello packet that is sent by the first routing bridge according to a period;

The parsing unit 902 is configured to parse the Hello packet received by the receiving unit 901.

The second determining unit 903 is configured to: if the Hello packet obtained through parsing of the parsing unit 902 carries change information indicating that the appointed forwarder for the C-VLAN is changed from the first routing bridge to the second routing bridge, determine that the first routing bridge no longer has permission to continue to forward the traffic from the C-VLAN.

Figure 10:
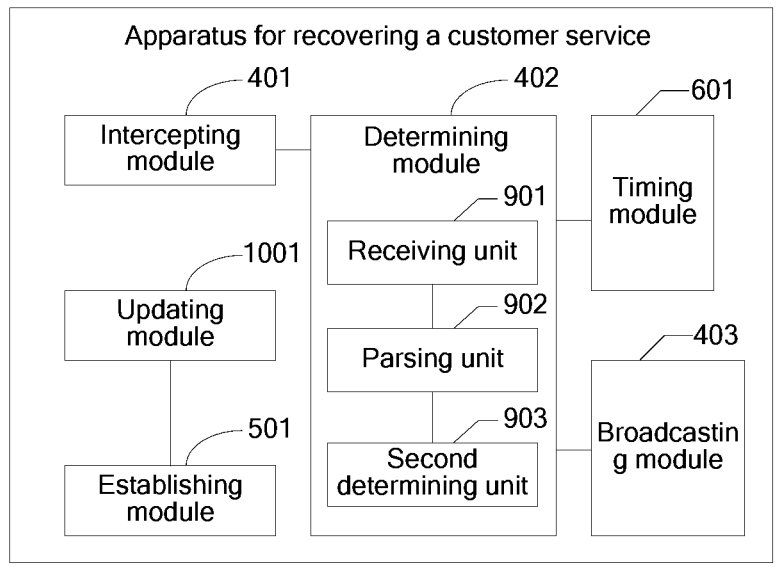
FIG. 10 is a block diagram of an apparatus for recovering a service according to another embodiment of the present application.

The apparatus shown in FIG. 9 may further include an updating module 1001, as shown in an apparatus for recovering a service according to another embodiment of the present application in FIG. 10. The updating module 1001 is configured to update the correspondence between the first routing bridge and the appointed forwarder for the C-VLAN that has been established by the establishing module 501 to a correspondence between the second routing bridge and the appointed forwarder for the C-VLAN.

Figure 11:
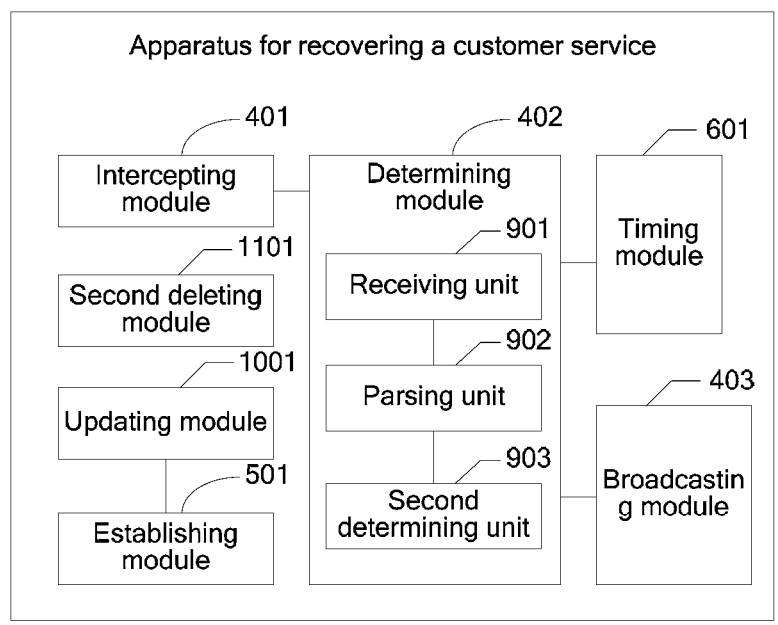
FIG. 11 is a block diagram of an apparatus for recovering a service according to another embodiment of the present application.

The apparatus shown in FIG. 9 may further include a second deleting module 1101, as shown in an apparatus for recovering a service according to another embodiment of the present application in FIG. 11. The second deleting module 1101 is configured to delete a MAC entry for the C-VLAN on the trusted port connected to the first routing bridge.

It should be noted that, content such as information interaction and execution process between modules/units of the foregoing apparatus brings the same technical effect as the method embodiment of the present application because they are based on the same conception, and for specific content, reference may be made to the descriptions in the method embodiment of the present application, which is not repeated herein.

All or a part of the methods in the foregoing embodiments of the present application may be implemented by a program instructing relevant hardware, for example, one or more or all of the following methods:

intercepting a trusted port connected to a first routing bridge, where the first routing bridge is an appointed forwarder of a C-VLAN on a TRILL network;

determining, according to an interception result of the intercepting, whether the first routing bridge has permission to continue to forward traffic from the C-VLAN; and if it is determined that the first routing bridge no longer has permission to forward the traffic from the C-VLAN, broadcasting the traffic from the C-VLAN to a second routing bridge so that the second routing bridge forwards the traffic from the C-VLAN, where the second routing bridge is a neighboring routing bridge of the first routing bridge.

A person of ordinary skill in the art may understand that, all or a part of the steps of the methods in the foregoing embodiments may be implemented by a program instructing relevant hardware. The program may be stored in a computer readable storage medium, and the storage medium may include a read-only memory (ROM), a random access memory (RAM), a magnetic disk, or an optical disk.

The method and the apparatus for recovering a service according to the embodiments of the present application are described in detail in the foregoing. The principle and implementation manners of the present application are described in the specification through specific examples. The descriptions about the foregoing embodiments of the present application are merely provided for helping understand the method and core ideas of the present application. A person of ordinary skill in the art may make variations to the present application in the terms of the specific implementation manners and application scopes according to the ideas of the present application. In conclusion, content of the specification shall not be construed as a limitation to the present application.

What is claimed is:

1. A method for avoiding interruptions in an on-going service, comprising:

intercepting, by a local area network (LAN) bridge, Hello packets sent by a first routing bridge periodically at a first trusted port of the LAN bridge connected to the first routing bridge, wherein the first routing bridge is a current appointed forwarder of a data flow from a customer virtual local area network (C-VLAN) to a transparent interconnection of lots of links (TRILL) network; and wherein the LAN bridge is located at an edge of the TRILL network and is a different entity from the first routing bridge;

determining, by the LAN bridge, the first routing bridge does not forward or no longer has a permission to forward the data flow from the C-VLAN to the TRILL network when one of the following has occurred: none of the Hello packets is received at the first trusted port during a pre-determined number of time periods; and a Hello packet is received at the first trusted ports and it carries information indicating that the first routing bridge is no longer the appointed forwarder; and based on the determination that the first routing bridge does not forward or no longer has the permission to forward the data flow from the C-VLAN, broadcasting, by the LAN bridge, the data flow from the C-VLAN, so that the data flow from the C-VLAN enters the TRILL network via a second routing bridge;

wherein the second routing bridge is a neighboring routing bridge of the first routing bridge, and the second routing bridge replaces the first routing bridge as a new appointed forwarder for the data flow from C-VLAN to the TRILL network.

2. The method according to claim 1, wherein before intercepting the Hello packets at the first trusted port of the LAN bridge connected to the first routing bridge, the method further comprises:

establishing, by the LAN bridge, a correspondence between the first trusted port and the first routing bridge; and recording, by the LAN bridge, the first routing bridge as the current appointed forwarder for the C-VLAN.

3. The method according to claim 2, wherein after determining that the first routing bridge does not forward or no longer has permission to forward the data flow from the C-VLAN, and before broadcasting the data flow from the C-VLAN, the method further comprises:

clearing, by the LAN bridge, the established correspondence between the first trusted port and the first routing bridge and clearing a record in which the first routing bridge is the current appointed forwarder for the C-VLAN.

4. The method according to claim 2, wherein after determining that the first routing bridge does not forward or no longer has the permission to forward the data flow from the C-VLAN, and before broadcasting the data flow from the C-VLAN, the method further comprises:

deleting, by the LAN bridge, media access control (MAC) entries of all virtual local area networks (VLANs) on the first trusted port of the LAN bridge connected to the first routing bridge.

5. The method according to claim 1, wherein after determining that the first routing bridge does not forward or no longer has permission to forward the data flow from the C-VLAN and before broadcasting the data flow from the C-VLAN, the method further comprises:

establishing, by the LAN bridge, a correspondence between a second trusted port and the second routing bridge; and recording, by the LAN bridge, the second routing bridge as the new appointed forwarder for the C-VLAN.

6. The method according to claim 1, wherein after determining that the first routing bridge does not forward or no longer has permission to forward the data flow from the C-VLAN, and before broadcasting the data flow from the C-VLAN, the method further comprises:

deleting, by the LAN bridge, a media access control (MAC) entry of the C-VLAN on the first trusted port of the LAN bridge connected to the first routing bridge.

7. A local area network (LAN) bridge, comprising:

one or more ports, in which one is a first trusted port connected to a first routing bridge, wherein the first routing bridge is a current appointed forwarder of a data flow from a customer virtual local area network (C-VLAN) to a transparent interconnection of lots of links (TRILL) network;

a processor, configured to intercept Hello packets sent by the first routing bridge periodically at the first trusted port and determine the first routing bridge does not forward or no longer has a permission to forward the data flow from the C-VLAN to the TRILL network when one of the following has occurred: none of the Hello packets is received at the first trusted port during a pre-determined number of time periods; and a Hello packet is intercepted at the first trusted ports and it carries information indicating that the first routing bridge is no longer the appointed forwarder; and a broadcasting transmitter, configured to broadcast the data flow from the C-VLAN, so that the data flow from the C-VLAN enters the TRILL network via a second routing bridge, based on the determination that the first routing bridge does not forward or no longer has the permission to forward the data flow from the C-VLAN, wherein the second routing bridge is a neighboring routing bridge of the first routing bridge and the second routing bridge replaces the first routing bridge as a new appointed forwarder for the C-VLAN, and wherein the LAN bridge is located at an edge of the TRILL network and is a different entity from the first routing bridge.

8. The LAN bridge according to claim 7, wherein the processor is further configured to:

establish a correspondence between the first trusted port and the first routing bridge and record the first routing bridge as the current appointed forwarder for the C-VLAN.

9. The LAN bridge according to claim 8, further comprising:

a timer, configured to time the interception of the Hello packets at the first trusted port connected to the first routing bridge.

10. The LAN bridge according to claim 8, wherein after determining that the first routing bridge does not forward or no longer has permission to forward the data flow from the C-VLAN, and before broadcasting the data flow from the C-VLAN, the processor is further configured to:

clear the established correspondence between the first trusted port and the first routing bridge and a record in which the first routing bridge is the current appointed forwarder for the C-VLAN.

11. The LAN bridge according to claim 8, after determining that the first routing bridge does not forward or no longer has the permission to forward the data flow from the C-VLAN, and before broadcasting the data flow from the C-VLAN, the processor is further configured to:

delete media access control (MAC) entries of all virtual local area networks (VLANs) on the first trusted port connected to the first routing bridge.

12. The LAN bridge according to claim 7, wherein the processor is further configured to:

establish a correspondence between a second trusted port and the second routing bridge; and record the second routing bridge as the new appointed forwarder for the C-VLAN.

13. The LAN bridge according to claim 7, wherein the processor is further configured to:

delete a media access control (MAC) entry of the C-VLAN on the first trusted port connected to the first routing bridge.

* * * * *